United States Patent [19]

Kusaka

[11] Patent Number: 4,635,148
[45] Date of Patent: Jan. 6, 1987

[54] CASSETTE-RECEIVING DOOR DEVICE FOR CASSETTE TAPE RECORDER

[75] Inventor: Hiroki Kusaka, Saitama, Japan

[73] Assignee: Pioneer Electronic Corporation, Tokyo, Japan

[21] Appl. No.: 648,434

[22] Filed: Sep. 10, 1984

[30] Foreign Application Priority Data

Sep. 10, 1983 [JP] Japan .......................... 58-140416[U]

[51] Int. Cl.⁴ ............................................. G11B 15/18
[52] U.S. Cl. .................................... 360/96.6; 360/96.5
[58] Field of Search ..................... 360/96.1, 96.5, 96.6

[56] References Cited

U.S. PATENT DOCUMENTS

| | | | |
|---|---|---|---|
| 4,018,403 | 4/1977 | Schulz | 360/96.6 X |
| 4,250,527 | 2/1981 | Broghammer | 360/96.5 X |
| 4,319,292 | 3/1982 | Katoh | 360/96.5 |
| 4,385,332 | 5/1983 | Nahao et al. | 360/96.6 |
| 4,441,129 | 4/1984 | Nahao | 360/96.5 |
| 4,481,618 | 11/1984 | Nahayana | 360/96.5 X |
| 4,514,775 | 4/1985 | Manning et al. | 360/96.6 |

Primary Examiner—A. Michael Chambers
Assistant Examiner—John C. Fox
Attorney, Agent, or Firm—Sughrue, Mion, Zinn, Macpeak and Seas

[57] ABSTRACT

A cassette-receiving door device for a cassette tape recorder in which, when a cassette has been correctly loaded in a receiving section, the door device is automatically closed. Correct positioning of the cassette in the receiving device is detected by a pair of switches, which may be implemented with light-emitting elements and phototransistors, positioned at opposite sides of the lower end of the receiving section. If the outputs from both switches indicate that the cassette has been correctly received, a motor is actuated which, through a gear and slider mechanism, closes the cassette-receiving door device.

3 Claims, 7 Drawing Figures

CASSETTE-RECEIVING DOOR DEVICE FOR CASSETTE TAPE RECORDER

BACKGROUND OF THE INVENTION

The present invention relates to a cassette-receiving door device for receiving and holding a magnetic tape cassette in a tape recorder, tape deck or video tape recorder. More particularly, the invention relates to a cassette-receiving door device of this type in which an electric motor is used to automatically open and close the door.

A cassette-receiving device for receiving and holding a magnetic tape cassette in a cassette tape recorder or the like has been well known. These devices are often termed "kangaroo-pocket" type cassette-receiving devices. Examples of such conventional cassette-receiving devices are shown in FIGS. 1 and 2.

The cassette-receiving device shown in FIG. 1 includes a rockable door 1 fixed to a cassette-receiving case 1a having a protrusion 1b. The cassette-receiving case 1a is urged in the direction of the arrow A by a spring 1c. The cassette-receiving device further includes a rockable member 2 having a groove 2a engageable with the protrusion 1b of the case 1a and urged by a spring 2b into abutment with a regulating member 2c, and an air damper coupled to the cassette-receiving case 1a. In the cassette-receiving device in FIG. 2, instead of the air damper 3 used in the device of FIG. 1, an oil damper 3' is employed.

The operation of the cassette-receiving device of FIG. 1 will be described. FIG. 1 shows the door 1 in the closed state. To open the door 1, first a force is manually applied to the rockable member 2 to turn the latter in the direction of the arrow A. As a result, the protrusion 1b of the cassette-receiving case 1a is disengaged from the groove 2a of the rockable member 2 so that the door 1 is opened by the elastic force of the spring 1c at a speed regulated by the damper 3. To close the door, a force is applied to the door 1 to turn the latter in the direction of the arrow B. When the protrusion 1b comes into abutment with the edge member 2, the door 1 is locked closed. The operation of the cassette-receiving device shown in FIG. 2 is the same as that of the cassette-receiving device in FIG. 1 described above.

As is apparent from the above description, the conventional cassette-receiving door device shown in FIG. 1 is operated in two actions: in the first action a cassette is inserted into the cassette-receiving section, and in the second action the door is manually pushed so that it is closed and the cassette is loaded into the magnetic recording and the reproducing device.

The conventional cassette-receiving door device is disadvantageous in that the preparation time required for loading a cassette into the magnetic recording and reproducing device is relatively long. Moreover, since the door must be manually closed as described above, the operation of the device is troublesome and unsure; specifically, the door may not be positively locked.

Moreover, in the conventional cassette-receiving door device shown in FIG. 2, the two actions must be carried out in a parallel mode. Thus, this device is also disadvantageous in that the preparation time required for loading a cassette is relatively long.

SUMMARY OF THE INVENTION

Accordingly, an object of the present invention is to eliminate the disadvantages of the conventional cassette-receiving door for a tape recorder.

The foregoing and other objects of the invention have been achieved by the provision of a cassette-receiving door device for a cassette tape recorder which, according to the invention, comprises a cassette-receiving section for receiving and holding a magnetic tape cassette, the cassette-receiving section being supported in such a manner that it can be freely opened and closed; drive means for opening and closing the cassette-receiving section; and switch means arranged at one or both sides of the lower end of the cassette-receiving section, the switch means detecting when a magnetic tape cassette is properly inserted into the cassette-receiving section to provide an output signal or signals to activate the drive means, thereby to automatically close the cassette-receiving section.

DESCRIPTION OF THE PREFERRED EMBODIMENTS

Figure 1:
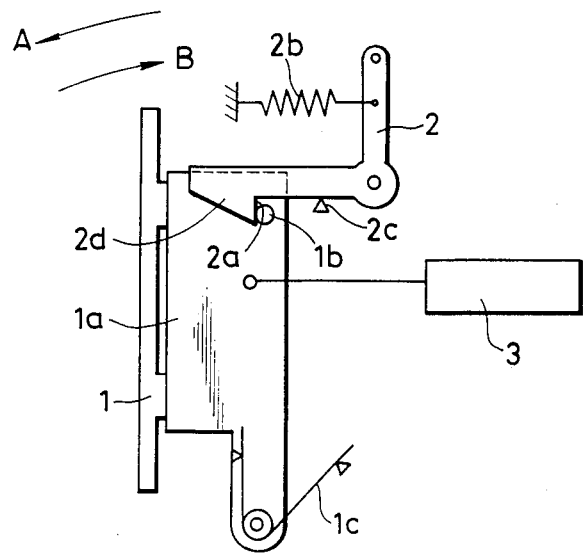
FIGS. 1 and 2 are side views showing examples of a conventional cassette-receiving door device.
Figure 2:
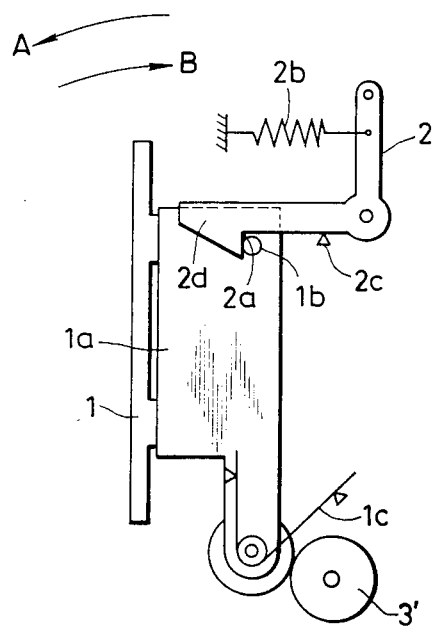

The present invention will now be described with reference to a preferred embodiment shown in FIGS. 3 through 7.

In these figures, reference numeral 10 designates a cassette-receiving section including a "kangaroo-pocket" 11 and a door 12 forming the front surface of the pocket 11. An L-shaped arm 13 extending from the bottom of the pocket 11 is pivotally mounted on a chassis at the middle point thereof to provide support for the cassette-receiving section 10. The cassette-receiving section 10 is urged in the opening direction by a tension spring 14 connected to the free end of the arm 13. Two pairs of switches 16 for detecting the presence of a cassette TK are arranged at respective lower corners of the inside of the pocket 11 of the cassette-receiving section 10. Alternatively, only one pair of switches 16 can be provided, located, preferably, midway at the lower portion of the inside of the pocket 11.

The switches 16 are optical switches each composed of a light-emitting element, namely, a light-emitting diode, and a light-detecting element, namely, a phototransistor. One of the switches 16 includes a light-emitting diode 16a and a phototransistor 16b, and the other switch 16 a light-emitting diode 16c and a phototransistor 16d. The cassette-receiving section 10 has a spring (not shown) to urge the cassette to be ejected therefrom.

The cassette-receiving section 10 is connected through a connecting piece 15 to a slider 20 which is mounted on the chassis in such a manner that it is movable back and forth in a direction perpendicular to the door 12 when the latter is closed. The slider 20 includes a linear part 21 and a regulating part 22 extending perpendicular to the linear part 21. The linear part 21 has two guide holes 23 of equal lengths arranged in a line. Guide pins 24 fixed to the chassis are engaged with respective ones of the guide holes 23 so that the slider is movable straightly through a predetermined stroke length. A locking slot 25 formed in the lower edge portion of the linear part 21 is engageable with a locking pin 26b extending from one end of an L-shaped locking stop lever 26 which is pivotally mounted on a pin 26a fixed to the chassis. The locking stop lever 26 is pulled by a tension spring 27 so that the locking pin 26b is engaged with the locking slot 25. The other end of the locking stop lever 26 is formed into a cam-follower contact end 26c which contacts a cam 32 (described below).

A rotary member 30, including an integral large gear 31, is rotatably supported near the slider 20. The cam 32 is formed coaxially with the gear 31. The cam 32 is used to control the position of locking stop lever 26. One half of the peripheral surface of the cam 32 is semicircular, providing a locked state releasing surface 32a, and the other half is a motion-permitting surface 32b of variable radius. When the surface 32b is in abutment with the contact end 26c of the lever 26, the locking pin 26b of the lever 26 can be engaged with and disengaged from the locking slot 25.

An movement-preventing protruding arc 33 having the function of preventing the movement of the slider 20 is formed on one side of the large gear 31 outside the motion-permitting surface 32b of the control cam 32, extending over about one quarter of the circumference of the large gear. The larger part of the arc 33 is in the region of the motion-permitting surface 32 with which the locking stop lever 26 is moved in the locked-state releasing direction, and the remaining part overlaps the locked-state releasing surface 32a.

The large gear 31 is engaged with the last gear 34a of a reduction gear group 34, the input gear 34b of which is engaged with an output gear 35a fixed to the output shaft of an electric motor 35 so that the torque of the motor 35 is transmitted to the large gear 31.

The large gear 31 further has an operating protrusion 36 for controlling the operation of the motor 35. The operating protrusion 36 is arranged to stop the motor 35 by operating a control switch 37 of the motor. Accordingly, the motor 35 is stopped once every revolution of the large gear 31.

The operation of closing the cassette-receiving section 10 will now be described.

Figure 4:
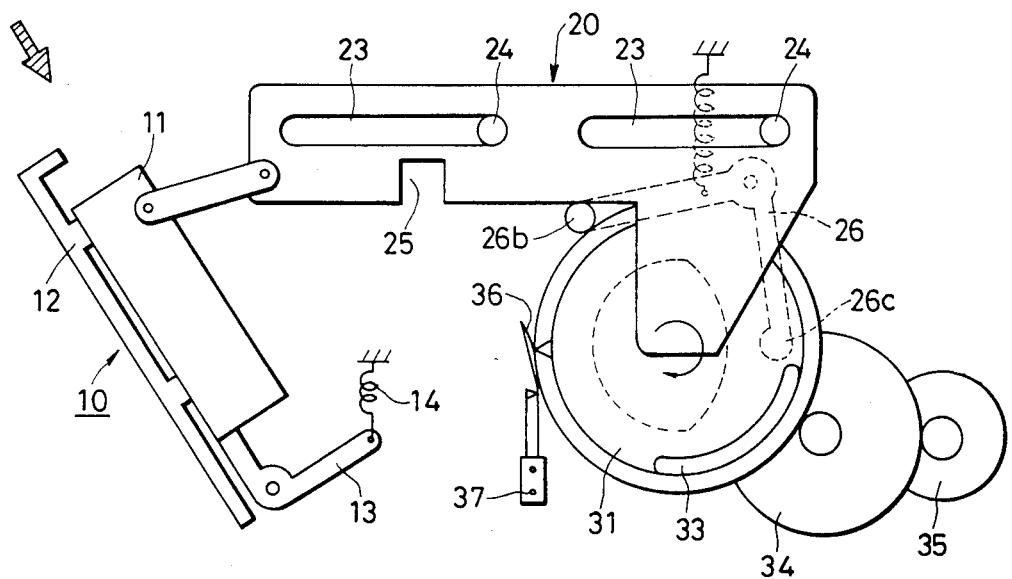
FIG. 4 is a side view of the same device in the case where the cassette-receiving door is open.
Figure 5:
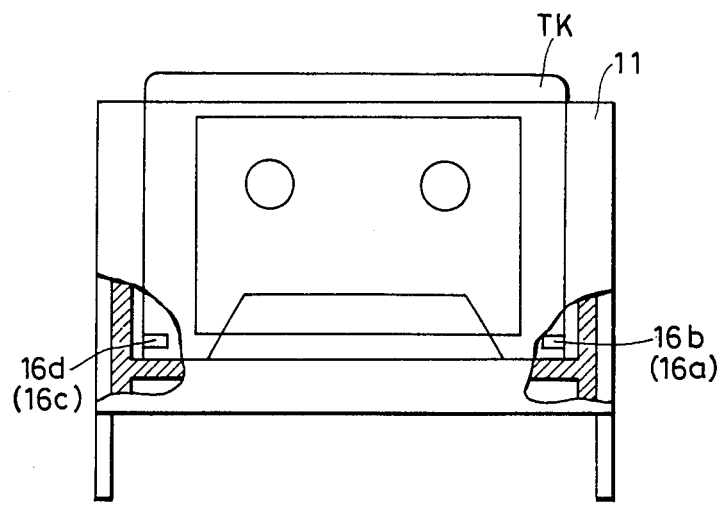
FIG. 5 is a front view of the cassette-receiving door with a cassette inserted correctly.

Before the closing operation, a cassette TK is inserted into the pocket 11 of the cassette-receiving section 10 from above, in the direction of the arrow in FIG. 4. The cassette TK drops along the guide (not shown) of the pocket by force of gravity. Before the cassette reaches its final position shown in FIG. 5, the pair of switches 16 are operated.

When the switches 16 detect the insertion of the cassette TK, the phototransistors 16b and 16d provide outputs which cause the motor to start. As a result, the large gear 31 is turned clockwise at a constant speed. The arc 33 integral with the large gear 31 is turned until it abuts against the regulating part 22 of the slider 20, thus moving the slider in the direction of rotation of the large gear 31 as the latter rotates. At the same time, the cassette-receiving section 10 coupled to the slider 20 is moved in association with the movement of the slider 20. Thus, the operation of closing the cassette-receiving section 10 is started. As the large gear 31 is further rotated, the locking stop lever 26 starts rotating along the sloped surface of the control cam 32. When the large gear 31 has made one complete revolution to the position shown in FIG. 3 starting from its initial state shown in FIG. 4, the control switch 37 is operated by the protrusion 36 of the large gear 31 to thus stop the motor. At that time, the locking pin 26b of the locking stop lever 26 is engaged with the locking slot 25 formed in the slider 20. At this point, the door closing operation is completed.

Figure 6:
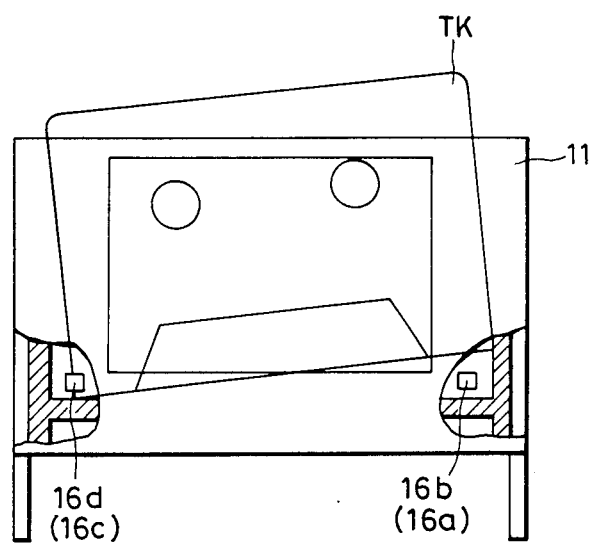
FIG. 6 is a front view of the cassette-receiving door with a cassette inserted tilted.

If, when a cassette TK is inserted into the pocket 11 of the cassette-receiving section 10, the cassette TK is tilted as shown in FIG. 6, if two pairs of the switches 16 are provided, the switch 16 composed of the light-emitting diode 16a and the phototransistor 16b is not operated, and accordingly the drive unit for driving the motor is not activated.

Figure 3:
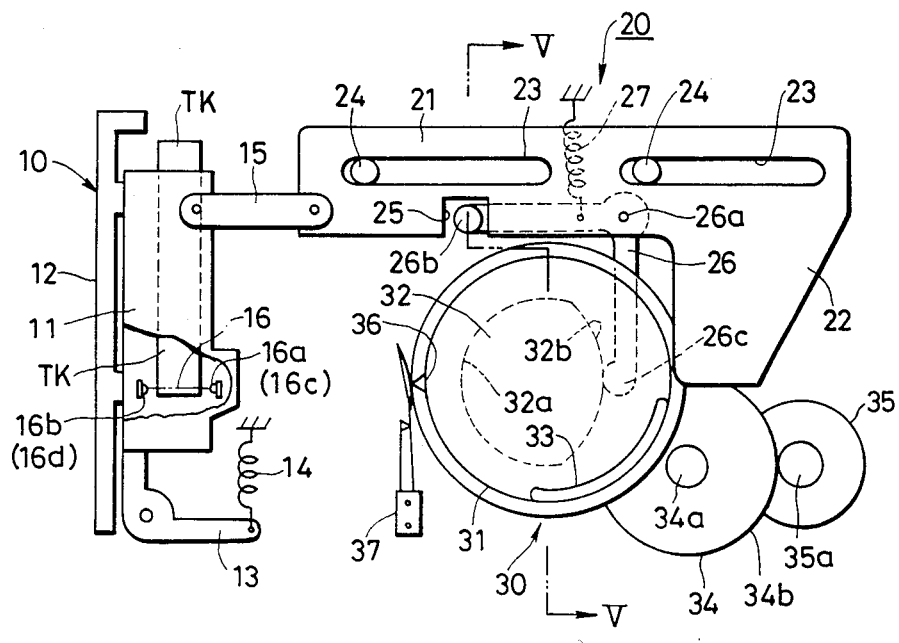
FIG. 3 is a side view of a cassette-receiving door device according to the invention illustrating the case where the cassette-receiving door is closed.

Next, the operation of opening the cassette-receiving section into which a cassette has been inserted as shown in FIG. 3 will be described.

When the motor 35 is energized upon operating an EJECT button (not shown), the motor 35 starts rotating. The torque of the motor 35 is transmitted through the reduction gear group 35 to the large gear 31, as a result of which the latter starts rotating.

When the large gear 31 turns, the control cam 32 and the regulating ring 33 also turn. As a result, the arc 33 is brought into abutment against the regulating part 22 of the slider 20, and the control cam 32 turns the locking stop lever 26 against the elastic force applied thereto through the contact end 26c of the locking stop lever 26. Therefore, the locking pin 26b is disengaged from the locking slot 25. As a result of the disengagement of the locking pin, the slider 20 is biased in the direction of ejection by the elastic force applied to the cassette-receiving section 10. However, movement of the slider 20 is prevented by the arc 33 of the large gear 31. When the contact end approaches the end of the motion-permitting surface 32b of the control cam 32, with the locking pin 26b of the locking stop lever 27 disengaged from the locking slot 25, the slider 20 is moved by the ejection force applied to the cassette-receiving section so that the cassette is ejected. While the contact end 26c of the locking stop lever 26 is maintained in contact with the locked-state releasing surface 32a of the control cam 32, the locking pin 26b is held apart from the slider 20.

When the large gear has made one complete revolution, the operating protrusion 36 operates the control switch 37 to stop the motor 35, and thus rotation of the large gear 31 is stopped.

The ejecting motion is stopped when the guide pins 24 abut against the ends of the guide holes 23 in the slider 20. The ejecting motion is provided by the elastic force of the spring connected to the cassette-receiving section 10. Therefore, even if there is an obstacle in the region of the ejecting motion of the cassette-receiving section 10, the motor will not be overloaded.

In the above-described embodiment, photoelectric switches are employed. However, they may be replaced by mechanical contact type switches, switch devices adapted to detect variations of electrostatic capacity, or switches using Hall elements to detect variations of magnetic flux.

As for the drive arrangement, the power transmission of the motor 35 has been described in conjunction with the slider 20 and the rotary member 30. However, a plunger or the like may be employed, that is, any mechanism that is capable of driving the cassette-receiving section in response to an electrical signal may be employed.

Figure 7:
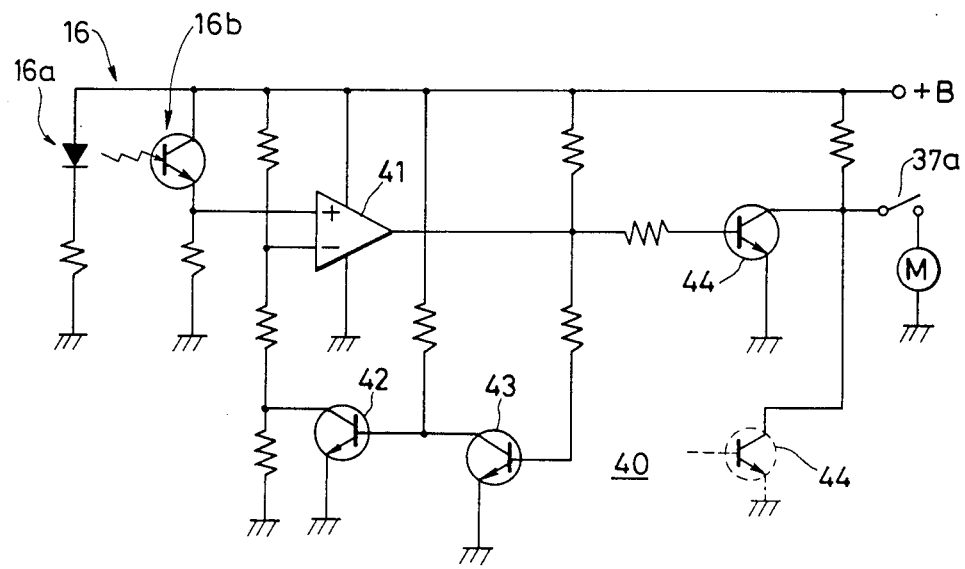
FIG. 7 is an electrical circuit diagram showing a circuit used with the cassette-receiving door device of the invention.

Referring now to FIG. 7, there is shown therein a circuit diagram of a drive circuit which may be employed with the door drive device of the present invention. The phototransistor 16 is connected in a common emitter mode with its emitter applied to the noninverting input of an operational amplifier 41. The output of the operational amplifier 41 drives a transistor 44, the collector of which is connected through the contact 37a of the switch 37 to one terminal of the motor M. The other terminal of the motor M is connected to ground. A feedback circuit composed of transistors 42 and 43 and associated resistors provides a reference voltage applied to the inverting input terminal of the operational amplifier 41. In the case that two switches 16 are employed, the collector of the transistor 44 of an identical circuit is connected to the collector of the transistor 44.

In operation, with no cassette inserted into the receiving section, or in the case where the cassette is incorrectly received therein, light from the light-emitting diode is received at the phototransistors 16, thereby turning on the phototransistors 16 and applying a positive voltage to the noninverting input terminal of the operational amplifier 41. This turns on the transistor 44, thereby depriving the motor M of drive current. On the other hand, if the light path between the light-emitting diode 16a and the phototransistor 16b is blocked, corresponding to the case of the cassette being correctly inserted into the receiving section, the phototransistor 16b is turned off, thereby applying a zero voltage to the noninverting input terminal of the operational amplifier 41. The transistor 42 is thereby turned on, lowering the reference voltage applied to the inverting input terminal of the amplifier 41. Also, the transistor 44 is turned off. If only one switch 16 is employed, or in the case that two switches 16 are employed when the other transistor 44 is also off, the motor M is free to receive current through the contact 37a.

As is apparent from the above description, in the cassette-receiving door device according to the invention, a pair of switches adapted to detect the presence of a cassette are arranged at respective ends of the cassette-receiving section, and electrical signals from the switches are utilized to effect the opening and closing of the door. Accordingly, if a cassette is inserted into the cassette-receiving section tilted, the cassette-receiving section will not close. Thus, components of the tape recorder such as capstans and reference pins as well as the cassette itself are protected from damage.

I claim:

1. A cassette-receiving door device for a cassette tape recorder, comprising:
   cassette-receiving means for receiving and holding a magnetic tape cassette, said cassette-receiving means being supported in such a manner that it can be freely opened and closed;
   drive means for opening and closing said cassette-receiving section; and
   switch means arranged at a lower end of said cassette-receiving section, said switch means detecting the presence of a magnetic tape cassette inserted into said cassette-receiving section, an output signal of said switch means being applied to activate said drive means thereby to automatically close said cassette-receiving section when a cassette has been correctly inserted into said cassette-receiving section;
   wherein said drive means comprises a slider mounted to be slidable in a direction perpendicular to a plane of said cassette-receiving means when said cassette-receiving means is in a closed position, said slider having a linear part and a regulating part extending perpendicular to said linear part, said linear part having a locking slot formed in an edge portion thereof; a locking stop level pivotally mounted at a central portion thereof and having first and second arms, said first arm comprising a locking pin engageable with said locking slot, and said second arm having a cam follower at an end thereof; spring means for rotatably biasing said locking stop lever in a direction so as to urge said locking pin in a direction of said locking slot; a rotary member comprising a gear, a cam portion formed coaxially with said gear, a protruding arc formed along a peripheral portion of said rotary member, and an operating protrusion formed on a peripheral portion of said rotary member, said cam follower of said locking stop lever being positioned to be engageable with said cam portion of said rotary member, and said rotary member being mounted at a position where said protruding arc can selectively engage said regulating part of said slider; motor means for rotating said gear; switch means positioned to be operated by said operating protrusion; and circuit means operating in response to outputs of said first-mentioned switch means and said second switch means for driving said motor.

2. The cassette-receiving door device of claim 1, wherein said slider has first and second holes receiving therein pins fixed to a chassis.

3. The cassette-receiving door device of claim 1, wherein a main portion of said protruding arc is positioned adjacent a smaller-diameter portion of said cam, and said operating protrusion is positioned adjacent a larger-diameter portion of said cam.

* * * * *